United States Patent [19]

Taniguchi et al.

[11] Patent Number: 4,946,001

[45] Date of Patent: Aug. 7, 1990

[54] APPARATUS AND METHOD OF CONTROLLING ELECTRIC POWER STEERING APPARATUS

[75] Inventors: Yoshiaki Taniguchi; Masaki Watanabe, both of Saitama; Ryuji Iizawa, Kanagawa, all of Japan

[73] Assignees: Jidosha Kiki Co., Ltd., Tokyo; Fujitsu Limited, Kawasaki, both of Japan

[21] Appl. No.: 321,628

[22] Filed: Mar. 8, 1989

[30] Foreign Application Priority Data

Apr. 30, 1988 [JP] Japan ................... 63-108287

[51] Int. Cl.$^5$ ............................................. B62D 5/04
[52] U.S. Cl. .............................. 180/79.1; 364/424.05
[58] Field of Search ............. 180/79.1, 140; 280/91; 364/424.05

[56] References Cited

U.S. PATENT DOCUMENTS

| | | | |
|---|---|---|---|
| 4,538,698 | 9/1985 | Hashimoto et al. | 180/79.1 |
| 4,664,211 | 5/1987 | Oshita et al. | 180/79.1 X |
| 4,730,686 | 3/1988 | Shimizy | 180/79.1 |
| 4,830,127 | 5/1989 | Ito et al. | 180/79.1 |
| 4,837,692 | 6/1989 | Shimizy | 180/79.1 X |
| 4,840,389 | 6/1989 | Kawabe et al. | 364/424.05 X |

FOREIGN PATENT DOCUMENTS 45-41246 12/1970 Japan .
291771 11/1988 Japan .................. 180/79.1

*Primary Examiner*—Mitchell J. Hill
*Attorney, Agent, or Firm*—Blakely, Sokoloff, Taylor & Zafman

[57] ABSTRACT

In a control method and apparatus of an electric power steering apparatus of this invention, a reverse torque R against a steering torque and a torque produced by the motor are detected, and a target value $T_{DT}$ which is set based on the reverse torque and is used when the torque produced by the motor is controlled has a range given by $T_{DT} \times R > R^2$.

5 Claims, 4 Drawing Sheets

APPARATUS AND METHOD OF CONTROLLING ELECTRIC POWER STEERING APPARATUS

BACKGROUND OF THE INVENTION

The present invention relates to an apparatus and method of controlling an electric power steering apparatus for assisting a steering torque by a driver (or operator) using a motor and, more particularly, to a control apparatus and method for improving straight drive stability during vehicle travel.

In a conventional control method of an electric power steering apparatus, an assisting torque always acts in a direction to assist a steering torque. A steering operation is performed such that a steering torque $T_D$ and an assisting torque $T_A$ overcome a reverse torque R, as shown in (a) and (b) in FIG. 10. In FIG. 10, reference symbol $SP_1$ denotes a spring component of a steering shaft; and $SP_2$, a spring component of a wheel.

As described above, since the steering shaft and the wheel have the spring components $SP_1$ and $SP_2$, the steering torque $T_D$ and the assisting torque $T_A$ must be transmitted to the springs so as to overcome the reverse torque R. For this purpose, even if $T_A=0$, the steering torque $T_D$ is given by:

$$T_D = R$$

When the steering torque $T_D$ slowly rises, as indicated by a dotted curve in FIG. 11, a straight drive direction during travel becomes ambiguous, resulting in poor straight drive stability. In order to rapidly rise the torque $T_D$, as indicated by a solid curve in FIG. 11, the spring components can be omitted, but a limitation is imposed thereon.

SUMMARY OF THE INVENTION

It is a principal object of the present invention to provide a control method and apparatus for an electric power steering apparatus, with which straight drive stability during vehicle travel can be improved as compared to a conventional method.

It is another object of the present invention to provide a control method and apparatus for an electric power steering apparatus, with which a steering angle can be immediately converged even at a small steering angle.

In order to achieve the above object, in an apparatus and method of controlling an electric power steering apparatus according to the present invention, a reverse torque R against a steering torque and a torque produced by a motor is detected, and a target value $T_{DT}$ which is set based on the reverse torque and is used to control the torque produced by the motor has a range given by $T_{DT} \times R > R^2$.

Thus, according to the present invention, straight drive stability can be improved.

DESCRIPTION OF THE PREFERRED EMBODIMENT

A preferred embodiment of the present invention will now be described with reference to the accompanying drawings.

Figure 1:
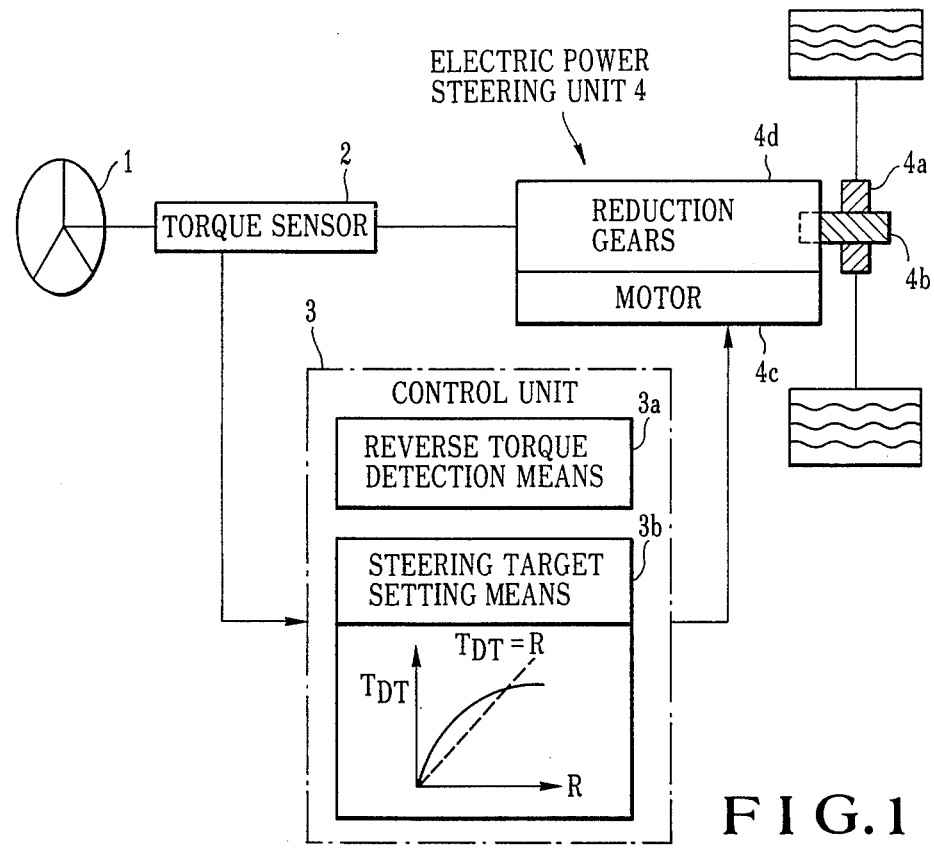
FIG. 1 is a block diagram showing an electric power steering apparatus to which a control method of the present invention is applied.

FIG. 1 shows an electric power steering apparatus to which a control method of the present invention is applied. In FIG. 1, reference numeral 1 denotes a steering wheel; 2, a torque sensor for detecting a torque based on an operation of the steering wheel 1; 3, a control unit for controlling an electric power steering unit 4 based on an output from the torque sensor 2; 3a, a reverse torque detecting means for detecting a reverse torque against a steering torque and a torque produced by a motor; and 3b, a steering target setting means for setting a target value of a steering torque based on the reverse torque. The electric power steering unit 4 includes a pinion 4b engaged with a rack 4a coupled to wheels, a motor 4c, and reduction gears 4d arranged between the motor 4c and the pinion 4b, as is known to those who are skilled in the art.

Figure 2:
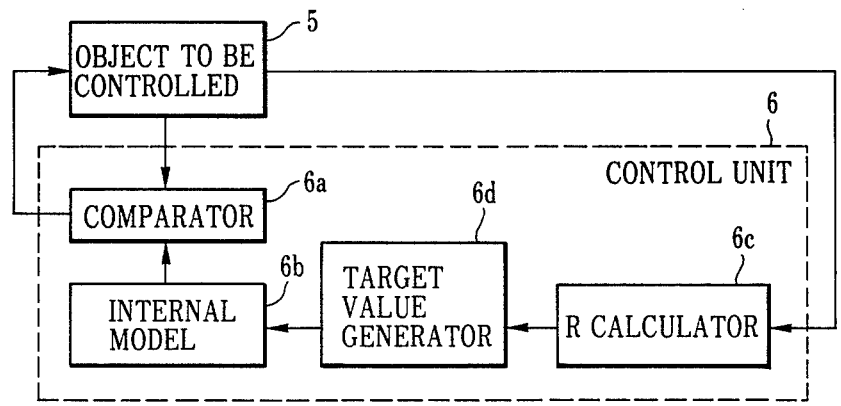
FIGS. 2 and 3 are block diagrams of a control system to which an embodiment of a control method of an electric power steering apparatus according to the present invention is applied.
Figure 3:
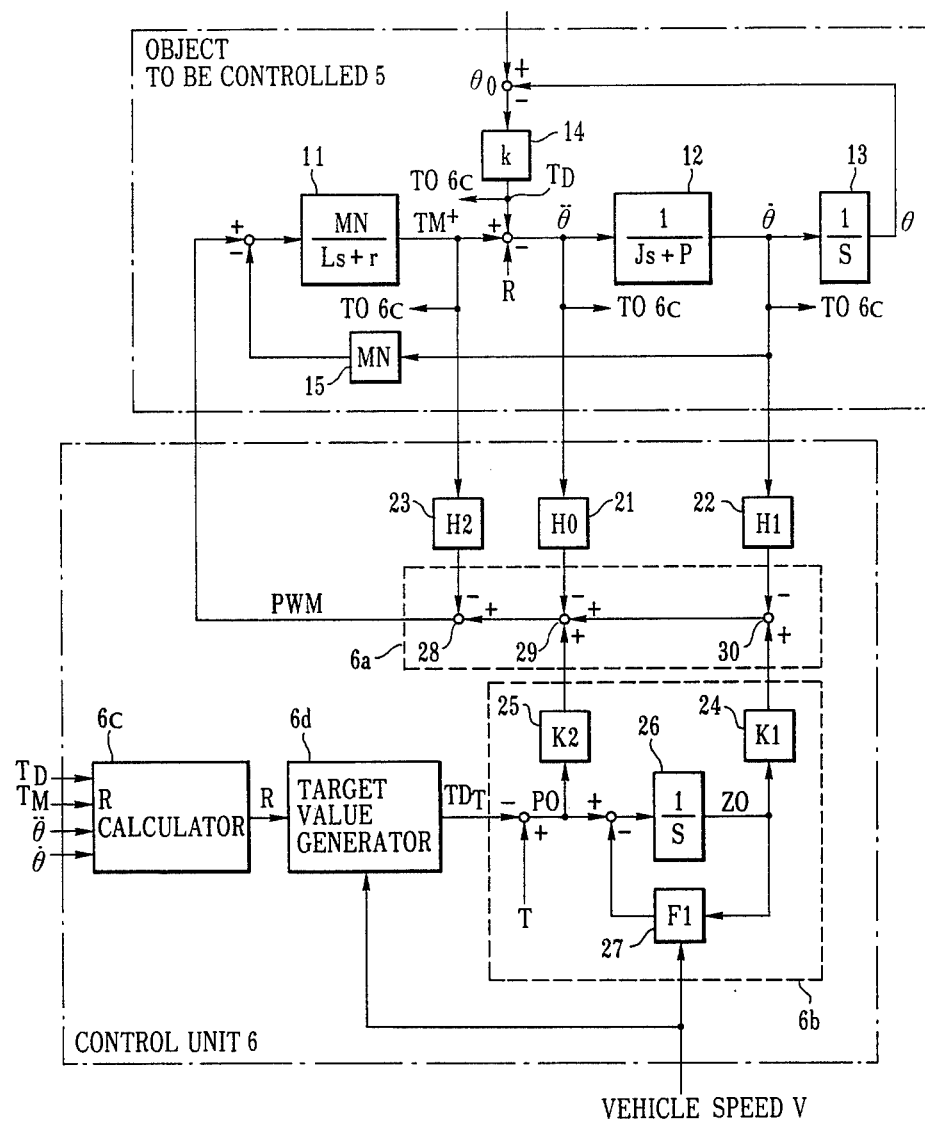

FIGS. 2 and 3 show a control system to which the embodiment of the control method of the electric power steering apparatus according to the present invention is applied. In FIGS. 2 and 3, reference numeral 5 denotes an object to be controlled; and 6, a control unit consisting of a comparator 6a, an internal model 6b, an R calculator 6c, and a target value generator 6d.

In FIG. 3, reference numerals 11 and 15 denote transfer functions indicating a function of converting a voltage into a current in the motor (consisting of a reactance L, a resistance r, and a motor constant M of the motor 4a, and a reduction gear ratio N of the reduction gears 4d), and a function of decreasing a voltage according to a pinion angular velocity $\theta_1$; 12, a transfer function representing a primary delay steering system (J is the inertial moment, and P is the viscosity coefficient); 13, a transfer function representing conversion of the pinion angular velocity $\theta_1$ into a pinion angle; and 14, a transfer function representing conversion of a difference between a steering angle $\theta_0$ by a driver and a pinion angle $\theta_1$ into a steering torque $T_D$. Note that reference symbol R denotes the reverse torque or reactive force described above against a steering force and an output from the motor (rotational force), and corresponds to a force returning from a road surface to the pinion shaft. Reference symbol S denotes a transformation quantity in the Laplace transformation.

In FIG. 3, reference numeral 6c denotes an R calculator; 6d, a target value generator for receiving the reverse torque R output from the R calculator and outputting a target torque $T_{DT}$ according to a vehicle speed V; 21, 22, and 23, transfer functions representing proportionality constants of a pinion angular acceleration $\theta_1$, the pinion angular velocity $\theta_1$, and a motor torque value $T_M$; 24 and 25, transfer functions representing proportionality constants of a difference P0 between the target value and an actual value and an output value Z0 of an ideal primary delay system; 26, a transfer function of an integral function; 27, a transfer function serving as a damper; and 28, 29, and 30; adders for generating a pulse-width modulation signal PWM for controlling a motor voltage. The transfer functions 26 and 27 constitute the ideal primary delay system.

In FIG. 3, the actual object 5 to be controlled is represented by the transfer functions 11 to 15, and a portion excluding the transfer functions 21 to 23 and adders 28 to 30 represents an ideal control system, i.e., always having good convergence.

The control system shown in FIG. 3 controls the motor so that the function of the object 5 is approximate to the function of the ideal control system. The transfer function 27 as a damper having a damper value F1 changes depending on a vehicle speed, so that a control system with good convergence of a vehicle with respect to every vehicle speed can be obtained.

Figure 4:
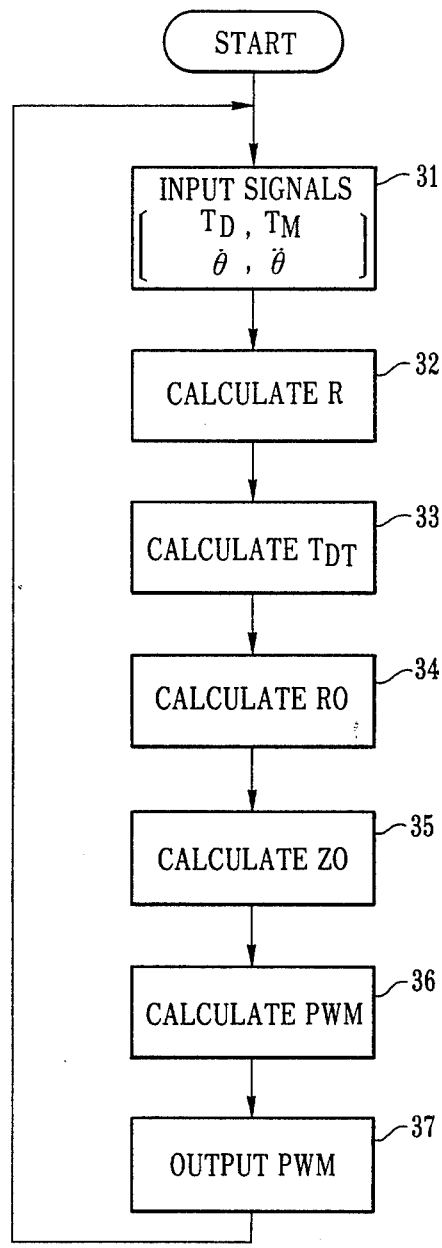
FIG. 4 is a flow chart for explaining an embodiment of a control method of an electric power steering apparatus according to the present invention.

FIG. 4 is a flow chart showing the control method of the present invention. Signals such as $T_D$ are input, and the reverse torque R is calculated by the R calculator 6c (steps 31 and 32). The target value generator 6d calculates the target torque $T_{DT}$ using the calculated reverse torque R and a vehicle speed (step 33). P0 and Z0 are calculated based on the target torque $T_{DT}$ and the input steering torque $T_D$ (steps 34 and 35), as shown in FIG. 3. A signal PWM is calculated as indicated by the adders 28 to 30 in FIG. 3, and is output to the object to be controlled 5 (steps 36 and 37).

Steering characteristics will now be described. A steering operation is achieved by the force relationship between the steering torque $T_D$ and the reverse torque R against a torque $T_M$ produced by the motor 4c. More specifically, the torques R and $T_D$ are respectively given by:

$$R = T_D + T_M - J\theta - D\theta \quad (1)$$
$$T_D = k(\theta_0 - \theta)$$

Figure 5:
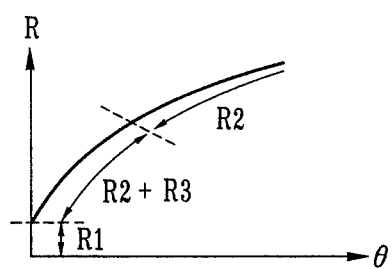
FIG. 5 is a graph showing reverse torque vs. pinion angle characteristics.
Figure 6:
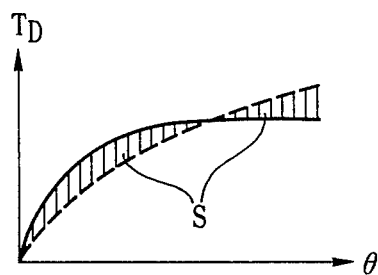
FIG. 6 is a graph showing steering torque vs. pinion angle characteristics.
Figure 7:
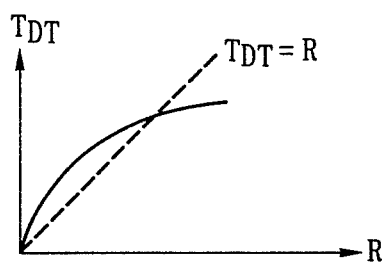
FIG. 7 is a graph showing target torque vs. reverse torque characteristics.

The reverse torque R consists of a sliding resistance R1 of a link system, a self-aligning torque R2 caused by wheel alignment, and a road resistance R3 transmitted through the wheels. Therefore, a change in reverse torque R when the steering wheel is turned during travel is as shown in FIG. 5 (pinion angle is plotted along the abscissa). In order to increase a rise angle of the steering torque $T_D$ with respect to the pinion angle to be larger than a conventional one (dotted curve), as indicated by a solid curve in FIG. 6, the target torque $T_{DT}$ is set, as indicated by a solid curve in FIG. 7 to add a region S to the dotted characteristic curve in FIG. 6. The dotted line in FIG. 7 represents a straight line given by $T_{DT}=R$. Thus, straight drive stability can be improved.

The above-mentioned control method can provide the following additional effect. In general, when a steering wheel is turned through a small steering angle, the reverse torque R is small, and the steering wheel cannot be quickly returned. When the target torque $T_{DT}$ is set, as shown in FIG. 7, the motor torque $T_M$ acts to increase the steering torque $T_D$ in a region where the reverse torque R is small. More specifically, since the motor torque $T_M$ acts in a direction to assist the reverse torque R, the steering wheel can be quickly returned from a small steering angle.

Figure 8:
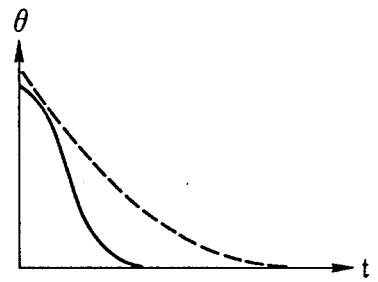
FIGS. 8 and 9 are graphs for comparing the control method of the present invention with a conventional method.
Figure 9:
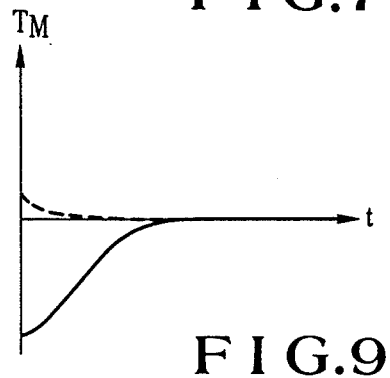
Figure 10:
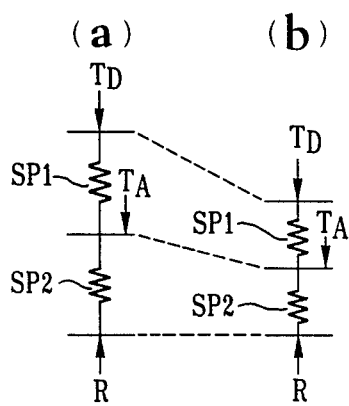
FIG. 10 is a view for explaining spring components of a steering shaft and a wheel.
Figure 11:
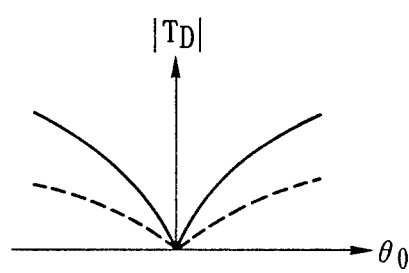
FIG. 11 is a graph showing steering torque vs. steering angle characteristics.

FIGS. 8 and 9 show characteristics of the pinion angle $\theta$ and the motor torque $T_M$ in this embodiment. In FIGS. 8 and 9, a solid curve represents a case of this embodiment, and a dotted curve represents a case of a conventional method. In FIG. 8, the pinion angle $\theta$, i.e., the steering angle $\theta_0$ is immediately converged, thus improving straight drive stability. FIG. 9 shows the corresponding motor torque $T_M$. As can be seen from FIG. 9, a reverse assisting torque is generated. Note that in the embodiment shown in FIG. 1, the reduction gears 4d are directly coupled to the pinion 4b coupled to the rack 4a. However, the reduction gears may be coupled to a worm gear provided to a steering shaft. The reduction gears 4d may be coupled to the rack 4a or a mechanism linked with the rack. The mechanism linked with the rack 4a may be directly driven by the output from the motor 4c without going through the reduction gears 4d.

As described above, with the control method of the electric power steering apparatus according to the present invention, a reverse torque R against a steering torque and a torque produced by the motor is detected, and a target value $T_{DT}$ which is set based on the reverse torque and is used to control the torque produced by the motor has a range given by $T_{DT} \times R > R^2$. Therefore, since the steering angle can be immediately converged even at a small steering angle, straight drive stability during travel can be improved.

What is claimed is:

1. An electric power steering apparatus for assisting a steering torque with a motor output torque, comprising:
   detection means for detecting a reverse torque R against the steering torque and the motor output torque;
   target value setting means for setting a target value $T_{DT}$, of a parameter for determining a steering operation based on the detected reverse torque R; and
   control means for controlling the motor output torque based upon the detected reverse torque R and the target value $T_{DT}$ whereby $T_{DT} \times R > R^2$.

2. An apparatus according to claim 1, wherein the steering torque is detected by a torque sensor connected to a steering unit.

3. An apparatus according to claim 1, wherein the reverse torque R is obtained by an R calculator for calculating the reverse torque based on the steering torque, the motor output torque, a pinion angular velocity, and a pinion angular acceleration.

4. A control method of an electric power steering apparatus, comprising the steps of:
   detecting a reverse torque R against a steering torque obtained by a steering operation and an output torque from a motor for assisting the steering torque;
   setting a target value TDT of a parameter for determining a steering operation based on the detected reverse torque R; and
   controlling the motor output torque based upon the detected reverse torque R and the target value TDT whereby $T_{DT} \times R > R^2$.

5. A method according to claim 4, wherein the reverse torque R is obtained by an R calculator for calculating the reverse torque based on the steering torque, the motor output torque, a pinion angular velocity, and a pinion angular acceleration.

* * * * *

UNITED STATES PATENT AND TRADEMARK OFFICE
CERTIFICATE OF CORRECTION

PATENT NO. : 4,946,001
DATED : 8/7/90
INVENTOR(S) : Taniguchi et al.

It is certified that error in the above-identified patent and that said Letters Patent is hereby corrected as shown below:

| | | |
|---|---|---|
| col. 02, line 52 | delete "$\theta_1$" | insert --$\dot{\theta}_1$-- |
| col. 02, line 56 | delete "$\theta_1$" | insert --$\dot{\theta}_1$-- |
| col. 03, line 3 | delete "$\theta_1$" | insert --$\ddot{\theta}_1$-- |
| col. 03, line 4 | delete "$\theta_1$" | insert --$\dot{\theta}_1$-- |
| col. 03, line 43 | delete "J$\theta$-D$\theta$" | insert --J$\ddot{\theta}$-D$\ddot{\theta}$-- |
| col. 04, line 57 | delete "TDT" | insert --$T_{DT}$-- |
| col. 04, line 62 | delete "TDT" | insert --$T_{DT}$-- |

Signed and Sealed this

Fifteenth Day of December, 1992

*Attest:*

DOUGLAS B. COMER

*Attesting Officer*  *Acting Commissioner of Patents and Trademarks*